(12) United States Patent
Hörman et al.

(10) Patent No.: US 8,810,215 B2
(45) Date of Patent: Aug. 19, 2014

(54) POWER SUPPLY WITH DYNAMIC INPUT CURRENT SUPPRESSION

(75) Inventors: Johan Hörman, Bromma (SE); Per Lindman, Djursholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/381,883

(22) PCT Filed: Apr. 28, 2010

(86) PCT No.: PCT/EP2010/055702
§ 371 (c)(1),
(2), (4) Date: Dec. 30, 2011

(87) PCT Pub. No.: WO2011/000588
PCT Pub. Date: Jan. 6, 2011

(65) Prior Publication Data
US 2012/0105028 A1     May 3, 2012

Related U.S. Application Data

(60) Provisional application No. 61/222,202, filed on Jul. 1, 2009.

(51) Int. Cl.
*G05F 1/00*     (2006.01)
(52) U.S. Cl.
USPC .......................................................... 323/266
(58) Field of Classification Search
USPC ..................... 323/225, 266, 271, 284, 299
See application file for complete search history.

(56) References Cited

U.S. PATENT DOCUMENTS

| 5,949,223 | A | 9/1999 | Mine |
| 6,504,348 | B2 * | 1/2003 | Stanley ......................... 323/280 |
| 6,507,505 | B2 * | 1/2003 | Oka et al. ........................ 363/47 |

(Continued)

FOREIGN PATENT DOCUMENTS

| CN | 1415134 A | 4/2003 |
| CN | 101383513 | 3/2009 |
| EP | 0794607 A2 | 9/1997 |
| EP | 1406373 A2 | 4/2004 |

OTHER PUBLICATIONS

Communication under Rule 71(3) EPC, EP Application No. 10717122.5, dated Oct. 31, 2012, 28 pages.

(Continued)

*Primary Examiner* — Gary L Laxton
*Assistant Examiner* — Alex Torres-Rivera
(74) *Attorney, Agent, or Firm* — Blakely Sokoloff Taylor & Zafman LLP (57) ABSTRACT

A power supply is described, which comprises a first stage DC-to-DC voltage conversion block and a second stage voltage conversion block having a feedback circuit to regulate the output voltage ($V_{out}$) thereof so as to reduce changes in the output voltage as the output current ($I_{out}$) drawn by a load changes. The power supply also includes a capacitor connected between the first and second stage voltage conversion blocks to supply current to the second stage voltage conversion block when the input voltage ($V_{int}$) to the second stage voltage conversion block changes due to changes in output current ($I_{out}$) of the second stage voltage conversion block. The first stage voltage conversion block comprises a feedback circuit to regulate the output voltage of the first stage voltage conversion block.

4 Claims, 5 Drawing Sheets

(56) References Cited

U.S. PATENT DOCUMENTS

| | | | |
|---|---|---|---|
| 7,019,503 B1 | 3/2006 | Ortiz et al. | |
| 7,141,940 B2* | 11/2006 | Ortiz | 315/291 |
| 7,199,563 B2* | 4/2007 | Ikezawa | 323/266 |
| 2005/0184712 A1 | 8/2005 | Wei et al. | |
| 2005/0275387 A1 | 12/2005 | Mitter et al. | |
| 2007/0139027 A1* | 6/2007 | Nishimori | 323/283 |
| 2008/0123706 A1* | 5/2008 | Zak et al. | 372/38.04 |
| 2009/0115393 A1* | 5/2009 | Yoshida et al. | 323/300 |

OTHER PUBLICATIONS

International Search Report and Written Opinion, Application No. PCT/EP2010/055702, dated Sep. 1, 2010, 12 pages.

International Preliminary Report on Patentability, Application No. PCT/EP2010/055702, dated Nov. 8, 2011, 6 pages.

Chinese Office Action, Application No. 201080030327.3, Jan. 30, 2014, 19 pages.

* cited by examiner

POWER SUPPLY WITH DYNAMIC INPUT CURRENT SUPPRESSION

CROSS-REFERENCE TO RELATED APPLICATIONS

This application is a National stage of International Application No. PCT/EP2010/055702, filed Apr. 28, 2010, which claims the benefit of U.S. Provisional Patent Application 61/222,202, filed Jul. 1, 2009, which are hereby incorporated by reference.

TECHNICAL FIELD

The present invention relates to the field of power supplies (also widely referred to as power or voltage converters) and, in particular, to a power supply having a first stage DC/DC voltage conversion block and a second stage voltage conversion block, each of the blocks being provided with an output voltage-regulating feedback circuit.

BACKGROUND

The demand for ever faster and more complex signal and data processing in telecoms systems and in other fields of application has fuelled the need for new generations of signal processing systems having multiple high-performance ULSI circuits (e.g. RFPAs, ASICs and FPGAs), which are characterised by their need for multiple low supply voltages, high levels of current demand and tight supply voltage regulation requirements. These needs are met by the so-called Distributed-Power Architecture (DPA) power supply, which may provide a number of tightly-regulated voltages from an input power source via a two-stage voltage conversion arrangement.

Figure 1:
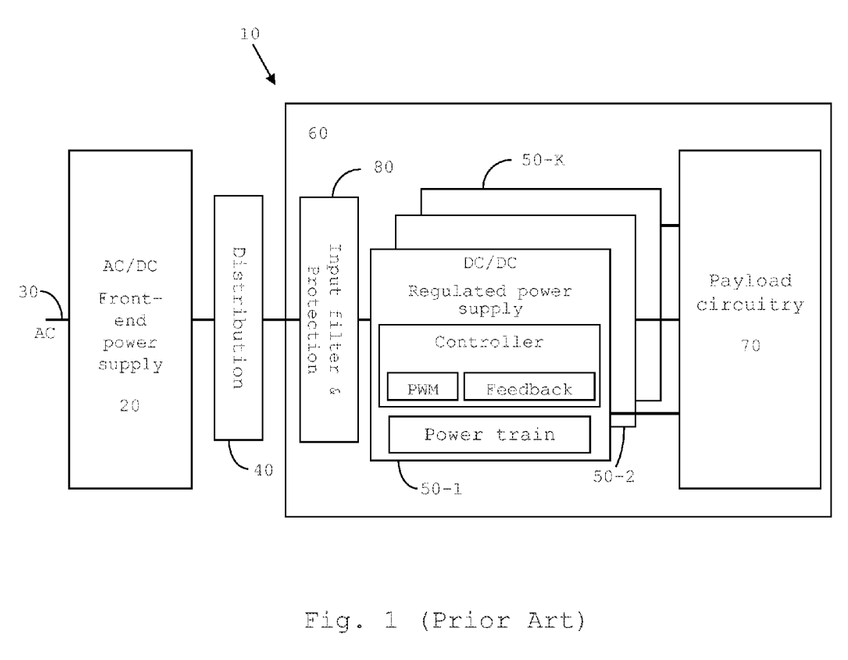
FIG. 1 is a schematic of a conventional IBA power system.

FIG. 1 is a schematic of a conventional DPA power supply connected to payload circuitry. The DPA power supply 10 is a power distribution system comprising a front-end AC/DC power supply 20 connected to an AC input power bus 30. The front-end AC/DC converter 20 is connected via an intermediate bus 40 to the inputs of a number (K) of second stage DC/DC power supplies 50-1 to 50-K, which are usually located on a host board 60, close to payload circuitry 70.

In the example of FIG. 1, each of the plurality of DC/DC power supplies 50-1 to 50-K is a buck converter commonly referred to as a "Point-of-Load" (POL) or a "Point-of-Source" (POS) converter. In general, the DC/DC power supplies 50-1 to 50-K may be converters providing isolation, non-isolated regulators or any combination thereof. The DC/DC converter often takes the form of a switched-mode power supply. The POL converters deliver a regulated voltage to their respective loads (functional holding) in the payload circuitry 70.

In order to save energy in the system, it is common to switch ON parts of the payload circuitry only when they are required and to leave them switched OFF at all other times. The variations in the load current caused by this switching require the POL converters' dynamic current handling capability to be improved.

European patent application EP 1 406 373 A1 discloses a Factorized Power Architecture ("FPA") method and apparatus for supplying power to highly transient loads, such as microprocessors. The apparatus includes a front-end power regulator (PRM) that provides a controlled DC bus voltage which is converted to the desired load voltage using a DC voltage transformation module ("VTM") at the point of load. The VTM converts the DC bus voltage to the DC voltage required by the load using a fixed transformation ratio and with a low output resistance. The response time of the VTM is less than the response time of the PRM. A first capacitance across the load is made large enough to support the microprocessor current requirement within a time scale that is preferably greater than or equal to the characteristic open-loop response time of the VTM. A second capacitance, at the input of the VTM, is made large enough to support the microprocessor current requirement within a time scale which is preferably greater than or equal to the closed-loop response time of the front-end power regulator. Feedback is provided from a feedback controller at the point of load to the front-end or to upstream, on-board power regulator modules to achieve precise regulation.

Thus the control function within known DC/DC converters, such as that described in EP 406 373 A1, is designed to optimize the converter's output parameters only and, in particular, to minimize deviations in the output voltage. With typical pulse-width modulated (PWM) converters, the only limitation in the control function is the maximum and minimum duty cycle range. Little or no attention has so far been paid to the effect that dynamic loads have on the converter's input current during normal operation. Highly dynamic loads can cause a large ripple to appear in the input current of the converters 50-1 to 50-K, which may make the converter incompatible with current telecom standards for power distribution in a telecom system.

A common approach to ensuring compliance with current telecom standards for input current ripple is to add a relatively large input filter that includes a high capacitance, as indicated at 80 in FIG. 1. However, this has the disadvantage of the size of the filter usually being similar to the size of the DC/DC converter module itself. Size constraints normally force the designer to solve the problem by reducing the adverse effects of the dynamic load in many steps instead of addressing the problem close to its source.

In some applications, such as radio base stations, the radio is located near the antenna and the power feeding is typically done with a long cable that may be 100-300 m in length. This cable will have a high inductance. In these cases, step changes in the input current add a reactive deviation in the supply voltage. Currently, it is normal practice to increase the cable dimensions in order to reduce the voltage deviation effect from the cable. However, the increase in the cable dimensions will increase the cost of the cable.

An alternative solution to reducing the input current ripple to acceptable levels, which requires less space, is to connect an active linear electronic current regulator, built with MOSFETs in combination with capacitors, to the converter's input. This will remove the effect at one compact stage but will give rise to relatively high power losses.

Thus, known approaches to mitigating the effects of highly dynamic input currents have resulted in increased power consumption, increased dimensions and costs of the power converter system.

It should be noted that the problems caused by dynamic current loads are not confined to power supplies in telecom systems. For example, another application where this problem arises is the power supply of electric fans. A modern fan includes a speed controller, which varies the fan speed by a low-frequency PWM function. The current drawn from the power supply will thus consist of a pulse train. A filter at the power supply's input is required in order to meet electromagnetic interference (EMI) requirements.

There is therefore considerable need for an improved power supply which overcomes the deficiencies of the prior art discussed above.

SUMMARY OF THE INVENTION

Measures which have been taken in the past to minimise the adverse effects of dynamic load currents on the power supply's input current typically employ some form of filtering at the power supply's input, as discussed above. However, the inventors of the present invention have approached the problem from an altogether different angle, realising that if the on-board DC/DC converters can handle and control dynamic load currents without generating dynamic input currents in the first place, the need for low frequency external filtering will be significantly reduced. A power supply of the present invention includes a DC/DC conversion block having control and power circuitries to handle dynamic load currents without generating dynamic input currents.

In particular, the present invention provides a power supply comprising a first stage DC-to-DC voltage conversion block, and a second stage voltage conversion block having a feedback circuit to regulate the output voltage thereof so as to reduce changes in the output voltage as the output current drawn by a load changes. The power supply further comprises a capacitor connected between the first and second stage voltage conversion blocks to supply current to the second stage voltage conversion block when the input voltage to the second stage voltage conversion block changes due to changes in output current of the second stage voltage conversion block. The first stage voltage conversion block comprises a feedback circuit to regulate the output voltage of the first stage voltage conversion block so as to reduce changes in the output voltage as the input voltage to the second stage voltage conversion block changes due to changes in the output current of the second stage voltage conversion block. The response of the feedback circuit of the first stage voltage conversion block is slower than that of the feedback circuit of the second stage voltage conversion block. The first stage voltage conversion block also includes a rate-limiting circuit to regulate the rate of change of the output voltage of the first stage voltage conversion block by the feedback circuit such that the rate of change of the input current to the first stage voltage conversion block remains below a predetermined value.

A power supply of the above configuration can cater for sharp increases and decreases in output current demand whilst ensuring that the input current does not change faster than specified. The size of the power supply's capacitor, which is arranged to deliver transient energy to the load, will be smaller than that used in current passive filters.

In a distributed power architecture system, a power supply in accordance with an embodiment of the present invention will allow the transient upstream currents in the system to be reduced, resulting in improved efficiency, reduced size and costs.

BRIEF DESCRIPTION OF THE DRAWINGS

Embodiments of the invention will now be explained by way of example only, in detail, with reference to the accompanying figures, in which.

DETAILED DESCRIPTION OF EMBODIMENTS

Figure 2:
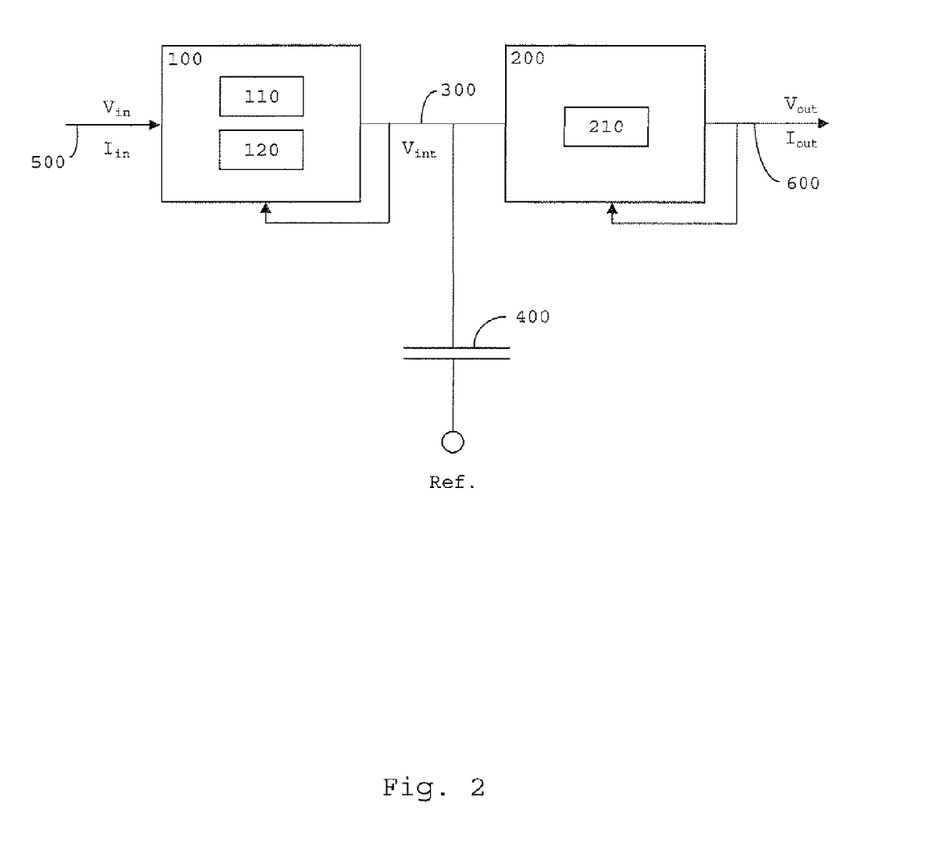
FIG. 2 shows a power supply in accordance with an embodiment the present invention.

FIG. 2 shows a power supply in accordance with an embodiment of the present invention, which includes as least two voltage conversion blocks connected in series and a capacitor connected therebetween. In particular, the power supply comprises a first stage voltage conversion block 100 and a second stage voltage conversion block 200, which are connected in series by an intermediate bus 300. A capacitor 400 is connected between the bus 300 and a reference point, such as earth.

In the present embodiment, each of the voltage conversion blocks 100 and 200 is a switched mode power supply (SMPS), which is a well-known type of power converter having a diverse range of applications by virtue of its small size and weight, and high efficiency. An SMPS achieves these advantages by switching a switching element, such as a power MOSFET, at a high frequency (usually tens to hundreds of kHz), with the frequency or duty cycle of the switching being adjusted by a controller, which uses a feedback signal to control the SMPS power train to convert an input voltage to a desired output voltage. The feedback signal is based on the converter's output voltage. An SMPS may generally take the form of a rectifier (AC/DC converter), a DC/DC converter, a frequency changer (AC/AC) or an inverter (DC/AC), and may or may not provide electrical isolation between its input and output. In the present embodiment, however, the voltage conversion blocks 100 and 200 are both DC/DC converters. Those skilled in the art will be familiar with general aspects of the construction and principles of operation of an SMPS such that a further explanation of these is not necessary here.

The first stage DC/DC converter 100 is arranged to convert the input voltage $V_{in}$ on an input 500 to an intermediate voltage $V_{int}$ on the intermediate bus 300, while the second DC/DC converter 200 is arranged to convert the intermediate voltage $V_{int}$ to an output voltage $V_{out}$, which is provided at an output 600 of the power supply. The capacitor 400 will be charged to the intermediate voltage level $V_{int}$. The output voltage $V_{out}$ is sensed by an output voltage sensing line of the second stage DC/DC converter 200 and processed by a feedback circuit 210 thereof, which has a fast reaction relative to the feedback circuit of the first stage voltage converter. The intermediate voltage $V_{int}$ is sensed by an output voltage sensing line of the first stage DC/DC converter 100 and processed by a feedback circuit 110 thereof having a relatively slow reaction relative to the feedback circuit of the second stage voltage converter.

The first stage DC/DC converter 100 includes internal circuitry comprising the feedback circuit 110 and a rate-limiting circuit 120, which controls the speed with which the converter's voltage conversion ratio changes during operation. The internal circuitry within the first stage DC/DC converter 100 also controls the change of the input current $I_{in}$ such that the rate at which the input current changes is limited to a specified value, for example 10 mA/μs, depending on the feeding system characteristics. In other words, the rate-limiting circuit 120 is arranged to regulate the rate at which the output voltage of converter 100 is changed by the converter's feedback circuit 110 such that the rate of change of the input current $I_{in}$ remains below 10 nA/μs. An example of this internal circuitry will be now be described with reference to FIG. 3.

Figure 3:
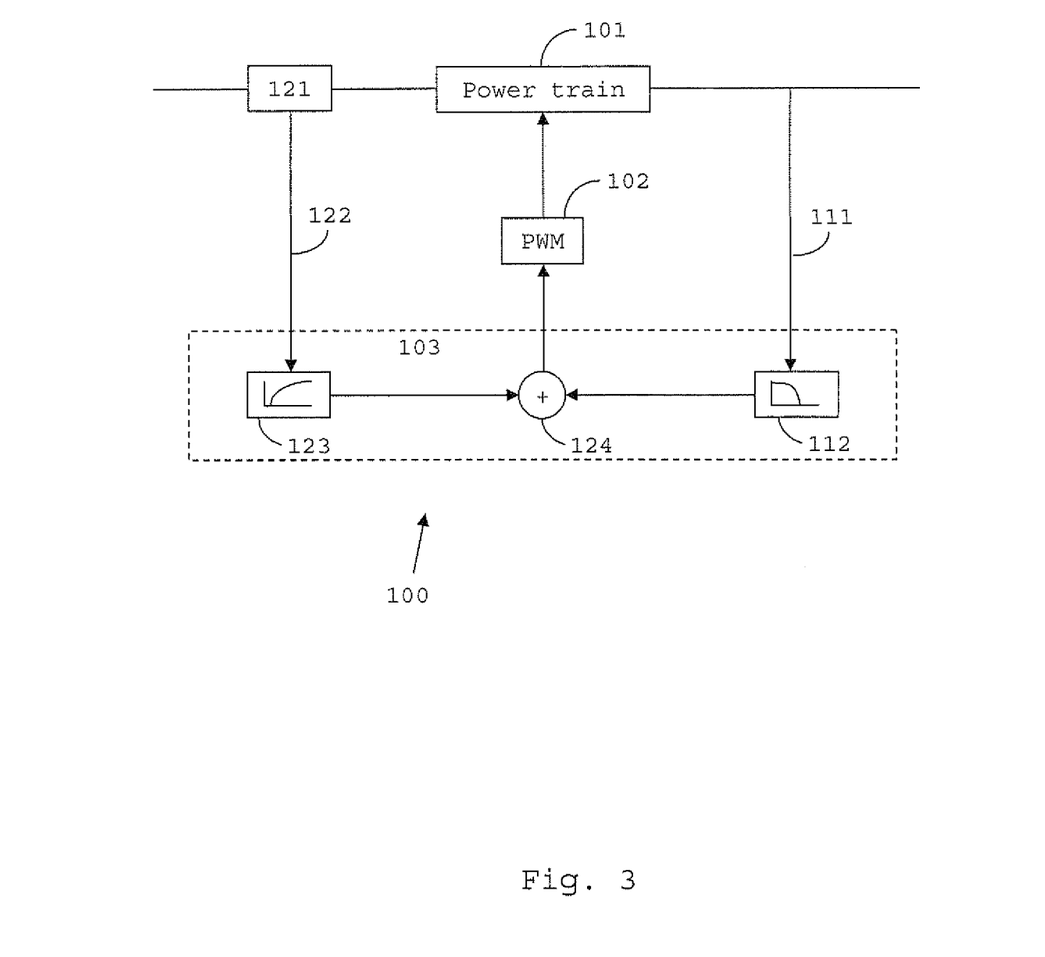
FIG. 3 shows details of the first stage voltage conversion block 100 shown in FIG. 2.

FIG. 3 is a schematic diagram showing details of the first stage DC/DC converter 100 that are helpful for understanding the present embodiment. In addition to familiar components such as the SMPS power train 101 and PWM controller 102, the first stage converter 100 of the present embodiment further comprises a signal processing unit 103 and an input current measuring device 121 connected thereto via an input current sensing line 122.

Changes in the input current $I_{in}$ are measured by the current measuring device 121, which generates a signal indicative of the measured input current. The current measuring device may be provided in any suitable form known to those skilled in the art. For example, the current measuring device may be implemented using a resistive element connected in series with an inductive element, the values of the elements depending on the system characteristics. The transfer function should be:

$$V' = aI + k\frac{dI}{dt} \quad \text{Eqn. 1}$$

where V' represents the output signal of the input current measuring device, and a and k are constants. The current sense signal V' is input to the signal processing unit 103.

The output voltage of converter 100 is sensed and also provided as an input to the signal processing unit 103 via the output voltage sensing line 111.

The signal processing unit 103 is arranged to process the signals input thereto via the current sensing line 122 and the output voltage sensing line 111, and to generate a control signal for controlling the voltage conversion ratio of the first stage converter 100. In the present embodiment, the signal processing unit is arranged to control duty cycle of the SMPS via the PWM controller 102. The signal processing unit 103 and an input current measuring device 121, together with the PMW controller 102, serve the functions of the feedback circuit 110 and the rate-limiting circuit 120, as will now be explained.

The signal processing unit 103 of the present embodiment includes a low-pass filter 112 arranged to filter the signal from the output voltage sensing line 111, and a high-pass filter 123 arranged to filter the signal from the input current sensing line 122. The filtered signals output from the low-pass filter 112 and the high-pass filter 123 are added together by an adder 124 that forms part of the signal processing unit 103. The resultant (summed) signal is provided as an input to the PWM controller 102.

Figure 4:
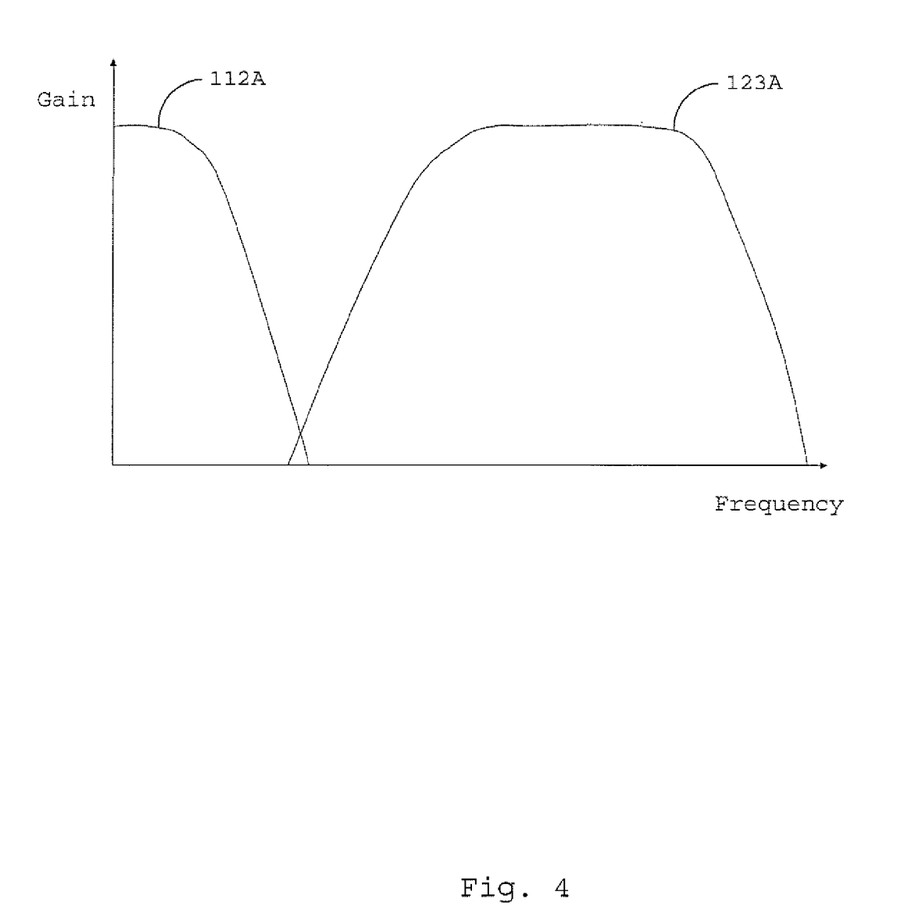
FIG. 4 is a schematic illustrating the frequency response of the high- and low-pass filters shown in FIG. 3.

The frequency response of the filters should have the characteristics shown in FIG. 4, where the curve 112A shows the frequency response of the low-pass filter and curve 123A shows the frequency response of the high-pass filter.

Within this arrangement, the feedback circuit 110 of converter 100, which comprises the output voltage sensing line 111, low-pass filter 112, adder 124 and PWM controller 102, has a relatively slow response time and will only be able to control the average output voltage of the converter 100. It is around this level the converter's output voltage will vary. The average output voltage is set by the input requirements of the load circuitry. The amplitude of variation is determined by the capacitance of capacitor 400 and the power requirements of the load. Maximum and minimum output voltage levels will be determined by the load.

The rate-limiting circuit 120 of the first stage converter 100, comprising the input current measuring device 121, the input current sensing line 122, high-pass filter 123 and adder 124, and is arranged to use the filtered input current sense signal to regulate the rate at which the output voltage of the first stage voltage DC/DC converter 100 is changed by the feedback circuit 110. The rate-limiting circuit will react faster than feedback circuit 110. Its lower frequency limit is several orders of magnitude faster than the output voltage sensing circuit and is determined by the maximum input current change rate that the feeding system is designed for. The upper frequency limit is determined largely by the capacitance of the capacitor 400. The rate-limiting circuit 120 is arranged to use the filtered input current sense signal to regulate the rate at which the output voltage of the first stage voltage DC/DC converter 100 is changed by the feedback circuit 110.

The signal processing unit 103 may be implemented by analog circuitry or by an integrated circuit of a digital controller. In digital systems a software code may be run to control the rate of change of the SMPS pulse width over time and to control the converter's output voltage.

Figure 5:
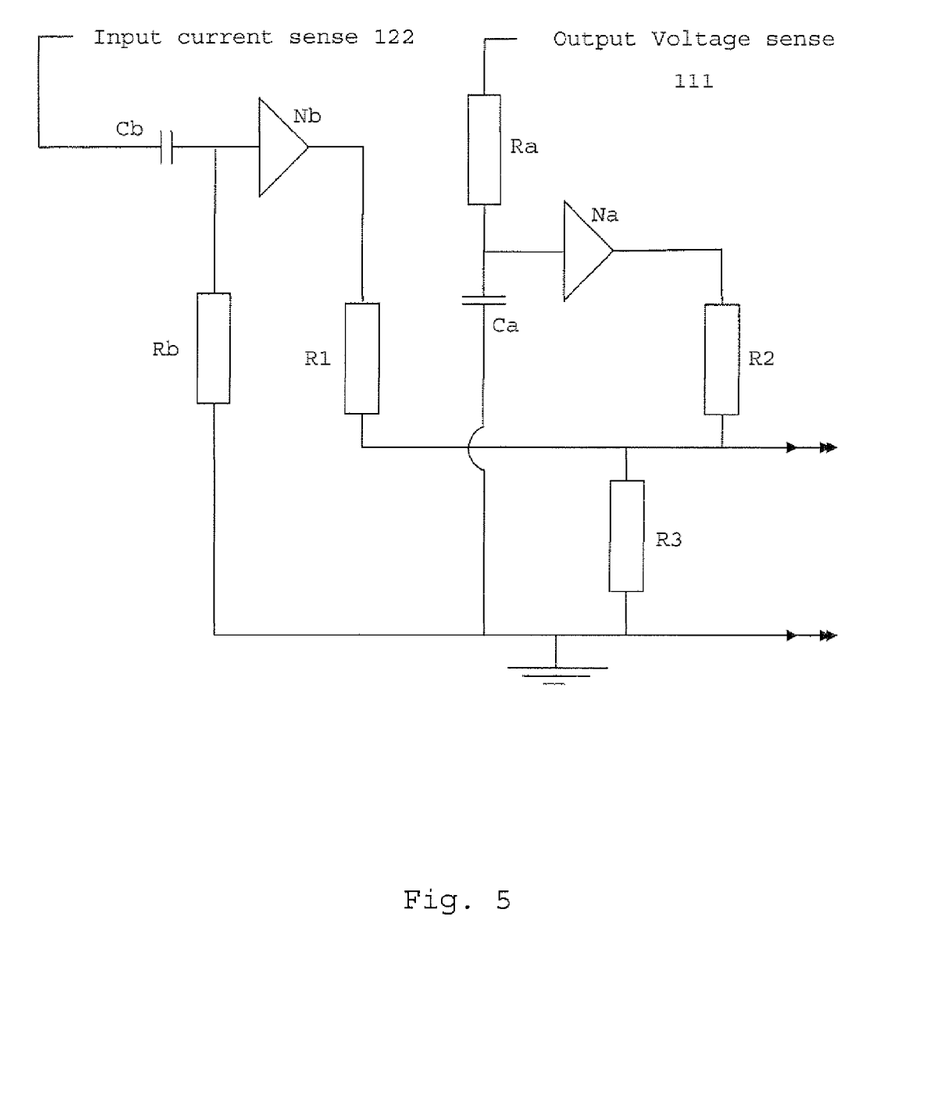
FIG. 5 is an example an analog implementation of signal processing unit 103 shown in FIG. 3.

Alternatively, the signal processing circuit 103 may be implemented in analog form, for example using the circuit shown in FIG. 5. In this example, the high-pass filter 123 to which the signal from the input current sensing line 122 is input is a first-order RC filter comprising capacitor $C_b$ and resistor $R_b$, which are connected as shown in FIG. 5. The output of the high-pass filter is amplified by amplifier $N_b$. Similarly, in this example the low-pass filter 112 is a simple RC filter comprising a resistor $R_a$ and a capacitor $C_a$. The output of the low-pass filter is amplified by amplifier $N_a$. The values of $R_a$, $C_a$, $R_b$ and $C_b$ are selected in accordance with needs to give the desired frequency response. The outputs of amplifiers $N_a$ and $N_b$ are combined using the illustrated arrangement of resistors $R_1$, $R_2$ and $R_3$ and output to the PWM controller 102.

The operation of the power supply of the present embodiment will now be explained. In case of a transient current increase on the output 600, for example, the second stage DC/DC converter 200 will react quickly to increase the power to the output 600. The feedback 210 ensures that the output voltage $V_{out}$ will be constant. The second stage DC/DC converter 200 will draw a larger current from the intermediate bus. The energy required will be supplied from the first stage DC/DC converter 100, but as the rate at which this converter is can change its voltage conversion ratio is limited in dependence upon a predetermined maximum value of the rate at which the input current is allowed to change, the majority of the energy will be supplied from the capacitor 400. As the capacitor 400 discharges, the intermediate voltage $V_{int}$ will drop and make the first stage DC/DC converter 100 increase the power drawn from the input 500 until the intermediate voltage $V_{int}$ reaches a steady value. The effect on the input current $I_{in}$ is that this current will not make any rapid changes.

As a result of the closed loop control, the first DC/DC converter 100 can control the rate at which the input current can change, as well as the output voltage. The input current is controlled to remain at or below the maximum rate of current change that the feeding system is designed for, and the output voltage is regulated to an average voltage and within maximum and minimum bounds set by the input requirements of the load circuitry.

The value of the capacitor 400 determines the voltage swing on the intermediate bus 300. The capacitance value of capacitor 400 should be selected in accordance with the requirements of the system which feeds power to the power supply, and the load circuitry connected to the power supply. In particular, the capacitance value will be determined by the rate of current change that the feeding system is designed for, and the maximum and minimum voltage requirements of the power supply's load circuitry.

[Modifications and Variations]

Many modifications and variations can be made to the embodiments described above.

For example, although the DC/DC converters are buck converters in the above embodiment, their topology is not limited to such and may alternatively be Boost, Buck-Boost etc. The second stage DC/DC converter (200) may alternatively be a DC/AC converter.

In addition, although both the first and second stage voltage conversion blocks in the power supply of the above embodiment are DC/DC voltage converters that provide isolation between their input and output, in an alternative embodiment one or both of these voltage conversion blocks may be a voltage regulator that does not provide such isolation. Furthermore, although both of the first and second stage voltage conversion blocks in the above embodiment is an SMPS, the form of these conversion blocks is not limited to such and one or both of the voltage conversion blocks may be a (non-switched) linear converter or linear regulator.

Furthermore, in the embodiment described above, the second stage DC/DC converter 200 is connected directly to payload circuitry. However, in an alternative embodiment, the load on the second stage converter may be provided by one or more further voltage conversion stages connected to its output.

The invention claimed is:

1. A power supply comprising:
    a first stage voltage conversion block;
    a second stage voltage conversion block having a second stage feedback circuit to regulate an output voltage of the second stage voltage conversion block ($V_{out}$) thereof so as to reduce changes in the output voltage ($V_{out}$) as a Direct Current (DC) output current ($I_{out}$) of the second stage voltage conversion block drawn by a load change; and
    a capacitor connected between the first and second stage voltage conversion blocks to supply current to the second stage voltage conversion block when a second stage input voltage ($V_{int}$) to the second stage voltage conversion block changes due to changes in the DC output current ($I_{out}$) of the second stage voltage conversion block;
    wherein the first stage voltage conversion block comprises:
    a first stage feedback circuit to regulate an output voltage of the first stage voltage conversion block so as to reduce changes in the output voltage of the first stage voltage conversion block, as the input voltage ($V_{int}$) to the second stage voltage conversion block changes due to changes in the DC output current ($I_{out}$) of the second stage voltage conversion block, a response of the first stage feedback circuit of the first stage voltage conversion block being slower than that of a second stage feedback circuit of the second stage voltage conversion block; and
    a rate-limiting circuit to regulate a rate of change of the output voltage of the first stage voltage conversion block by the first stage feedback circuit such that the rate of change of a DC input current ($I_{in}$) to the first stage voltage conversion block remains below a predetermined value;
    wherein the rate-limiting circuit comprises:
        a current measuring device for measuring the DC input current ($I_{in}$) to the first stage voltage conversion block, the current measuring device being arranged to generate a signal indicative of the measured input current;
        a high-pass filter for filtering the signal generated by the current measuring device, wherein the high-pass filter is directly coupled to the current measuring device;
        a low-pass filter;
        a pulse-width modulation controller;
        an adder arranged to add an output signal of the low-pass filter to the filtered signal output by the high-pass filter and to provide a resultant signal to the pulse-width modulation controller; and
        wherein the rate-limiting circuit is arranged to regulate the rate of change of the output voltage of the first stage voltage conversion block by the first stage feedback circuit using the filtered signal.

2. The power supply according to claim 1, wherein the low-pass filter arranged such that the response of the first stage feedback circuit of the first stage voltage conversion block is slower than that of the second stage feedback circuit of the second stage voltage conversion block.

3. The power supply according to claim 1, wherein the rate-limiting circuit is arranged to regulate the rate of change of the output voltage of the first stage voltage conversion block by the first stage feedback circuit such that the rate of change of the input current ($I_{in}$) to the first stage voltage conversion block remains below 10 mA/μs.

4. The power supply according to claim 1, wherein each of the first and second stage voltage conversion blocks is a DC/DC voltage regulator or a DC/DC voltage converter.

* * * * *

UNITED STATES PATENT AND TRADEMARK OFFICE
CERTIFICATE OF CORRECTION

PATENT NO. : 8,810,215 B2
APPLICATION NO. : 13/381883
DATED : August 19, 2014
INVENTOR(S) : Horman et al.

It is certified that error appears in the above-identified patent and that said Letters Patent is hereby corrected as shown below:

On the Title Page

Item (57), under "ABSTRACT", in Column 2, Line 2, delete "block" and insert -- block, --, therefor.

In the Specification

In Column 3, Line 61, delete "embodiment the" and insert -- embodiment of the --, therefor.

In Column 4, Line 4, delete "as least" and insert -- at least --, therefor.

In Column 4, Line 45, delete "$V_{in}$," and insert -- $V_{int}$ --, therefor.

In Column 4, Line 63, delete "10nA/μs." and insert -- 10mA/μs. --, therefor.

In Column 6, Line 27, delete "$C_h$" and insert -- $C_b$ --, therefor.

Signed and Sealed this
Fourteenth Day of July, 2015

Michelle K. Lee
*Director of the United States Patent and Trademark Office*